(12) United States Patent
Wilson

(10) Patent No.: US 11,724,653 B2
(45) Date of Patent: Aug. 15, 2023

(54) HOOD ORNAMENT MOUNTING SYSTEM

(71) Applicant: Stephen E. Wilson, Riverview, FL (US)

(72) Inventor: Stephen E. Wilson, Riverview, FL (US)

( * ) Notice: Subject to any disclaimer, the term of this patent is extended or adjusted under 35 U.S.C. 154(b) by 25 days.

(21) Appl. No.: 17/568,420

(22) Filed: Jan. 4, 2022

(65) Prior Publication Data

US 2022/0227311 A1 Jul. 21, 2022

Related U.S. Application Data

(60) Provisional application No. 63/138,639, filed on Jan. 18, 2021.

(51) Int. Cl.
*B60R 13/00* (2006.01)
*B60Q 1/28* (2006.01)
*B60Q 1/26* (2006.01)

(52) U.S. Cl.
CPC .......... *B60R 13/005* (2013.01); *B60Q 1/2623* (2013.01); *B60Q 1/28* (2013.01)

(58) Field of Classification Search
CPC ..... B60R 13/00; B60R 13/005; B60Q 1/2634; B60Q 1/2638; B60Q 1/28
See application file for complete search history.

(56) References Cited

U.S. PATENT DOCUMENTS

| | | | | | |
|---|---|---|---|---|---|
| 4,061,303 | A | * | 12/1977 | Ridgway | B60R 13/005 248/587 |
| 4,067,528 | A | * | 1/1978 | Motting | G09F 7/16 280/762 |
| 5,119,064 | A | * | 6/1992 | Perlman | B60Q 1/50 340/568.4 |
| 5,262,210 | A | * | 11/1993 | Sellers | B60R 13/005 280/727 |
| 5,376,415 | A | * | 12/1994 | Calabro | B60R 13/005 280/727 |
| 5,585,151 | A | * | 12/1996 | Bruning | B60R 13/005 280/727 |

(Continued)

FOREIGN PATENT DOCUMENTS

| | | | |
|---|---|---|---|
| CN | 110329162 A | * | 10/2019 |
| CN | 111775614 A | * | 10/2020 |

(Continued)

*Primary Examiner* — Barry Gooden, Jr.
(74) *Attorney, Agent, or Firm* — DP IP Group; Franco De Liguori

(57) ABSTRACT

A hood ornament mounting system is provided. The system includes a ring member having a keyed structure, including dentations, along an internal perimeter of the ring member, and a pair of through channels formed along an outside perimeter of the ring member at opposite regions. Additionally, the system includes a base member with a pair of recesses formed at opposite regions along a perimeter of the base member. The base member includes a bottom surface configured to contact a surface of an automobile and a top surface dimensioned to fit within the internal perimeter of the ring member. The base member has grooves on the perimeter to accommodate the dentations. A locking pin is seated in each of the pair of recesses. The locking pin is configured to lockingly interact with the keyed structure.

20 Claims, 10 Drawing Sheets

(56) References Cited

U.S. PATENT DOCUMENTS

| | | | | |
|---|---|---|---|---|
| 8,071,184 | B1* | 12/2011 | Dodt, Jr. | B60R 13/005 |
| | | | | 280/727 |
| 10,207,761 | B2* | 2/2019 | McKinster | B62J 50/225 |
| 2004/0037635 | A1* | 2/2004 | Viscount | G09F 21/04 |
| | | | | 403/348 |
| 2007/0124972 | A1* | 6/2007 | Ratcliffe | G09F 21/04 |
| | | | | 40/591 |
| 2008/0028650 | A1* | 2/2008 | Ratcliffe | G09F 21/04 |
| | | | | 40/591 |
| 2014/0246839 | A1* | 9/2014 | Hebenstreit | F16D 1/0888 |
| | | | | 280/124.125 |
| 2016/0054644 | A1* | 2/2016 | Samardzic | H04N 23/54 |
| | | | | 396/428 |
| 2022/0274536 | A1* | 9/2022 | Molyneux | B60R 13/005 |
| 2022/0274537 | A1* | 9/2022 | Molyneux | B60R 13/005 |

FOREIGN PATENT DOCUMENTS

| | | | | |
|---|---|---|---|---|
| CN | 112693402 | A * | 4/2021 | |
| CN | 115195660 | A * | 10/2022 | |
| DE | 3803970 | A1 * | 10/1998 | ........... B60R 13/005 |
| DE | 10000037 | A1 * | 7/2001 | ........... B60R 13/005 |
| DE | 10003917 | A1 * | 7/2001 | ........... B60R 13/005 |
| DE | 202009002669 | U1 * | 7/2009 | ........... B60R 13/005 |
| DE | 102015106106 | A1 * | 10/2016 | |
| DE | 102015106108 | A1 * | 10/2016 | |
| EP | 0438089 | A1 * | 7/1991 | ........... B60R 13/005 |
| EP | 0563634 | A1 * | 10/1993 | ........... B60R 13/005 |
| FR | 2675756 | A1 * | 10/1992 | ........... B60R 13/005 |
| WO | WO-8807945 | A1 * | 10/1988 | ........... B60R 13/005 |
| WO | WO-2014167589 | A1 * | 10/2014 | ......... B60K 15/0409 |

\* cited by examiner

HOOD ORNAMENT MOUNTING SYSTEM

CROSS-REFERENCE TO RELATED APPLICATION

This application claims priority to U.S. Provisional Patent Application No. 63/138,639 filed on Jan. 18, 2021.

BACKGROUND

Technical Field

The present invention relates to the automotive arts and more particularly to a hood ornament mounting system.

Background Information

Many automobiles have hood ornaments depicting, for example, automobile manufacturer logos. Additionally, some automobile owners desirous to customize their vehicles may wish to change a stock hood ornament with a novelty hood ornament that represents a university, a sports team, organization, or characters, for example.

Additionally, hood ornaments are often targets of vandalism and theft. This is especially true for custom hood ornaments. Consequently, there is a need for a hood ornament mounting system to include anti-theft features.

SUMMARY

According to an aspect of the present invention, a hood ornament mounting system is provided. The hood ornament mounting system includes a ring member having a keyed structure along an internal perimeter of the ring member. The keyed structure includes dentations. The ring member also includes a pair of through channels formed along an outside perimeter of the ring member at opposite regions. The hood ornament mounting system also includes a base member having a generally circular cross section with a pair of recesses formed at opposite regions along a perimeter of the base member. A bottom surface of the base member is configured to contact a surface of an automobile and a top surface of the base member is dimensioned to fit within the internal perimeter of the ring member. Additionally, the base member has grooves formed on the perimeter of the base member. The grooves are configured to accommodate the dentations.

A locking pin is seated in each of the pair of recesses. The locking pin includes a spring exerting an outward force on the locking pin relative to the base member and configured to lockingly interact with the keyed structure. The locking pin provides an anti-theft mechanism. A threaded rod extends from the bottom surface of the base member. The threaded rod is configured to be inserted into a through hole formed on the surface of the automobile.

According to yet another aspect of the present invention, a hood ornament mounting system is provided. The hood ornament mounting system includes a ring member having a keyed structure along an internal perimeter of the ring member. The keyed structure includes dentations. The ring member also includes a pair of through channels formed along an outside perimeter of the ring member at opposite regions. The hood ornament mounting system also includes a base member having a generally circular cross section with a pair of recesses formed at opposite regions along a perimeter of the base member. A bottom surface of the base member is configured to contact a surface of an automobile and a top surface of the base member is dimensioned to fit within the internal perimeter of the ring member. Additionally, the base member has grooves formed on the perimeter of the base member. The grooves are configured to accommodate the dentations.

A locking pin is seated in each of the pair of recesses. The locking pin includes a spring exerting an outward force on the locking pin relative to the base member and configured to lockingly interact with the keyed structure. The locking pin provides an anti-theft mechanism. A threaded rod extends from the bottom surface of the base member. The threaded rod is configured to be inserted into a through hole formed on the surface of the automobile. Additionally, a key having protrusions configured to enter the through channels is included. Each protrusion engages with a respective locking pin to exert an inward force on the locking pin to unlock the locking pin from the keyed structure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

An embodiment of the present invention provides a mounting system to removably attach a hood ornament to an automobile hood. Also, the mounting system provides an anti-theft feature preventing removal of the hood ornament without the use of a key.

Figure 1:
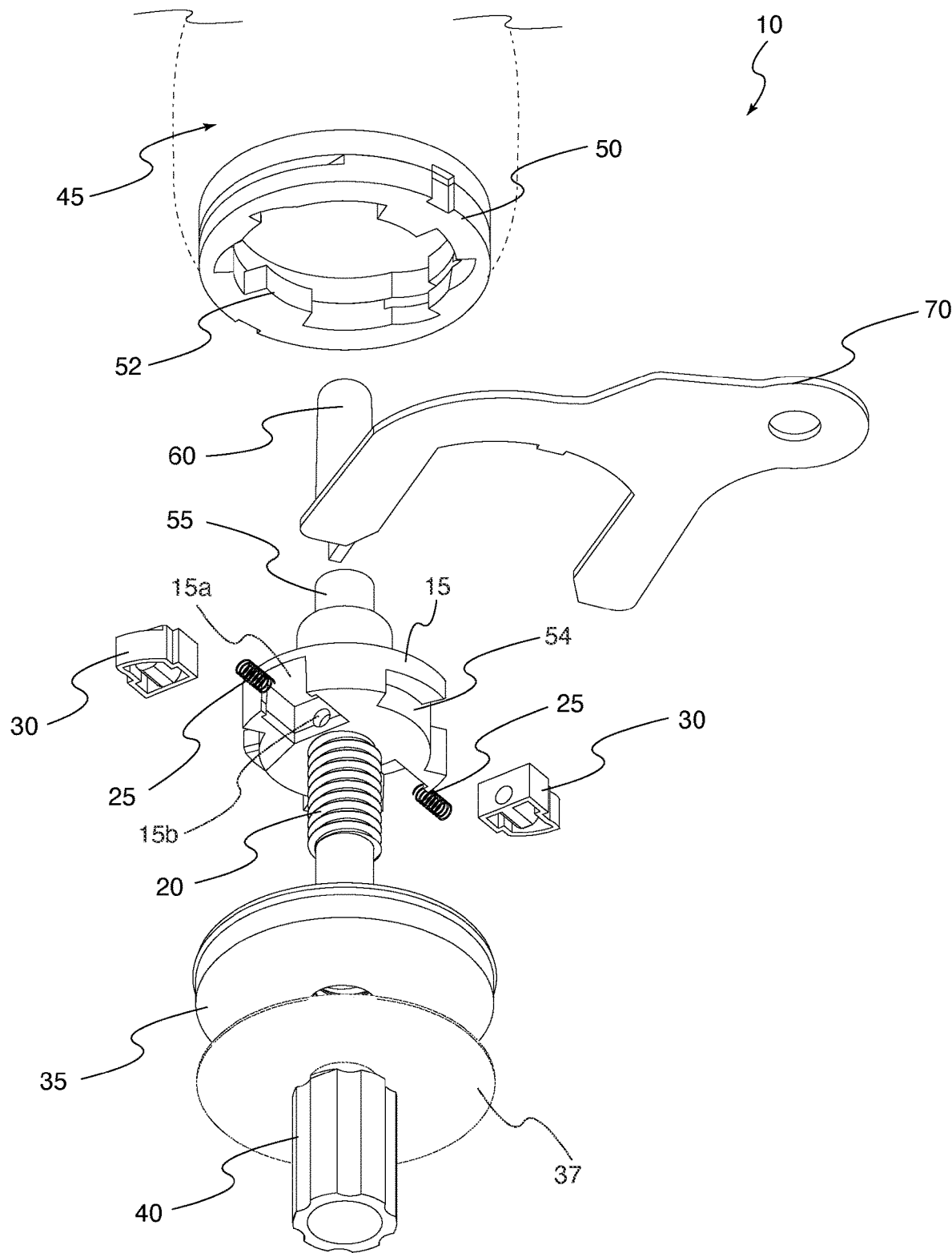
FIG. 1 is an exploded view of a hood ornament mounting system, in accordance with an embodiment of the present invention.

FIG. 1 shows an embodiment of the hood ornament mounting system 10 in an exploded view. The hood ornament mounting system 10 has a base member 15 having a generally circular cross section. The base member 15 includes a threaded rod 20 extending from a bottom surface of the base member 15. Herein, the term "bottom" refers to a side of the base member 15 configured to face and/or contact a surface of an automobile hood when the hood ornament mounting system 10 is assembled on the automobile hood. The threaded rod 20 is configured to extend through the automobile hood such that a washer 35 and rubber washer 37 can be held on a top surface of the automobile hood, and a nut 40 can be seated on the threaded rod 20 on an opposite side of the automobile hood. The nut 40 has threads matching the threads 204 (shown in FIG. 2) of the threaded rod 20. Additionally, the washer 35 can be threaded 206 (shown in FIG. 2) as well. In other embodiments, the washer 35 does not have threads. The rubber washer 37 can be provided as a protective barrier between the washer 35 and the surface of the automobile hood. The rubber washer 37 can prevent damage, such as scratches and dents, for example, to the surface of the automobile hood. Additionally, the rubber washer 37 can prevent water infiltration, thus reducing the likelihood of oxidation of the region of the automobile hood underlying the washer 35.

The base member 15 has recess seats 15b formed in recesses 15a on at least two opposing sides along an outside perimeter of the base member 15. Locking pins 30 are seated in the recesses 15a. A spring 25 supported by the recess seat 15b in each recess 15a exerts an outward force on the locking pin 30 relative to the base member 15. Thus, when in an assembled state, the locking pins 30 are biased by spring 25 in an outward direction (e.g., in a direction away from base member 15). The spring 25 can be a compression spring or other appropriate type of spring.

The locking pins 30 lockingly interact with a keyed structure. The keyed structure is formed on an internal perimeter of a ring member 50 and includes dentations 52. The base member 15 can be inserted into a central opening defined by the internal perimeter of the ring member 50. A quarter turn of the ring member 50 with respect to the base member 15 causes the locking pins 30 to rotate from their insertion position to a locking position within the ring member 50. In other embodiments, more or less than a quarter turn of the ring member 50 causes the locking pins 30 to rotate from their insertion position to the locking position within the ring member 50.

Figure 2:
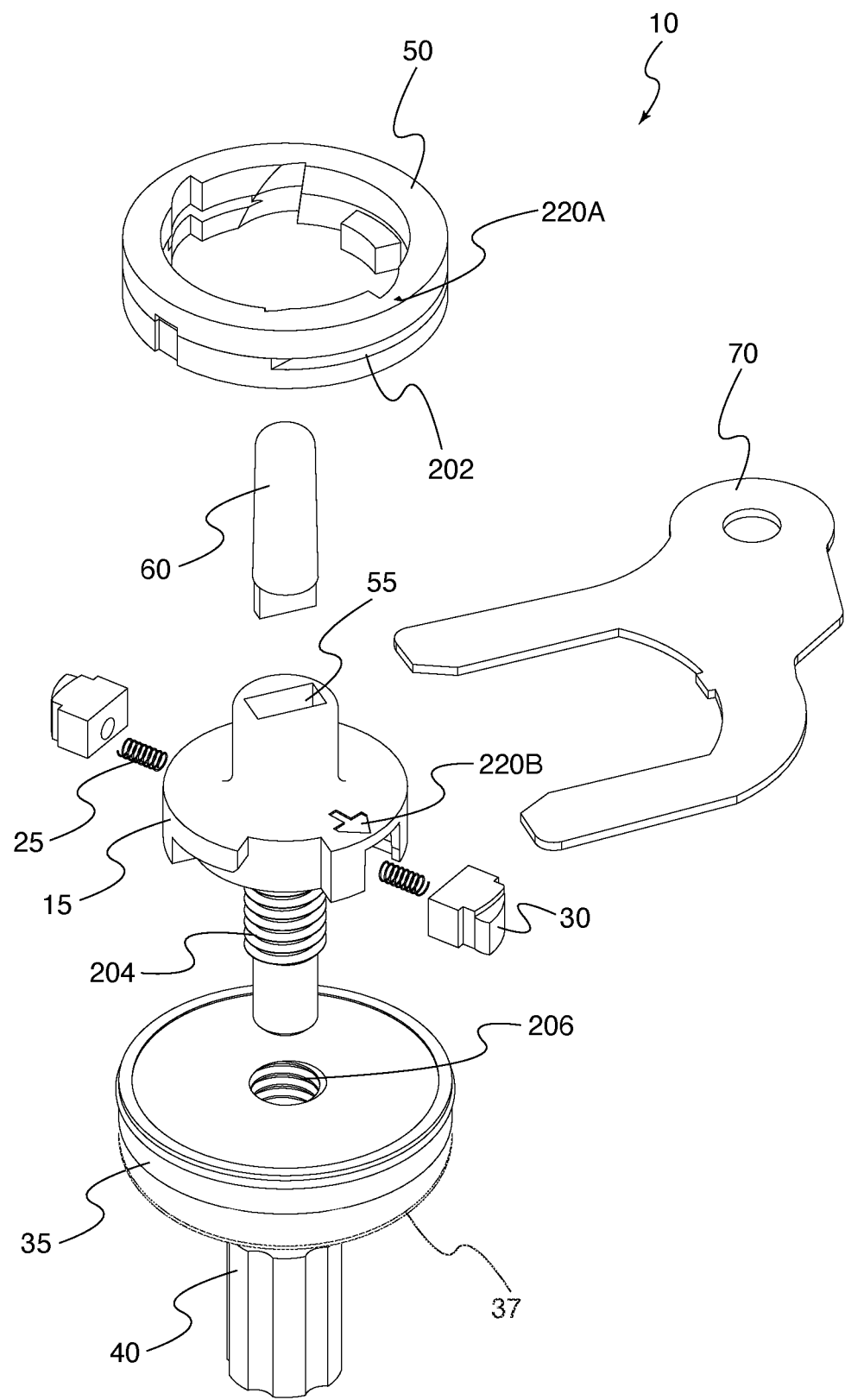
FIG. 2 is another exploded view of a hood ornament mounting system in accordance with an embodiment of the present invention.

Once the locking pins 30 are engaged in the locking position, the ring member 50 cannot be rotated against the base member 15 back to the original, e.g., disengaging, position without use of a key 70. Thus, embodiments of the present invention provide an anti-theft mechanism for the hood ornament. The dentations 52 is configured to slide into grooves 54. With the dentations 52 engaged with the grooves 54, the ring member 50 is securely held by the base member 15. As shown in FIG. 2, the key 70 includes protrusions configured to enter the through channels 202. Each protrusion engages with a respective locking pin 30 to exert an inward force on the locking pin 30 to unlock the locking pin 30 from the keyed structure.

The ring member 50 can be formed as a part of a hood ornament 45 in some embodiments. In other embodiments, the ring member 50 can be embedded in the hood ornament 45. In some embodiments, the base member 15 includes an electrical socket 55 configured to receive a light source 60, such as a light emitting diode (LED) lamp or incandescent light bulb, for example. Electrical wires from the electrical socket 55 can be passed through a hole 402, shown in FIG. 4B, formed along a longitudinal axis of the threaded rod 20 and onward to a wiring harness or battery. In some embodiments, the light source 60 can be powered by a replaceable battery. The replaceable battery can be integrated with the hood ornament mounting system 10. Alternatively, the replaceable battery can be housed in a separate casing and connected by wires to the light source 60. In other embodiment, the light source 60 is coupled by wires directly to a fuse box of the automobile.

Figure 4A:
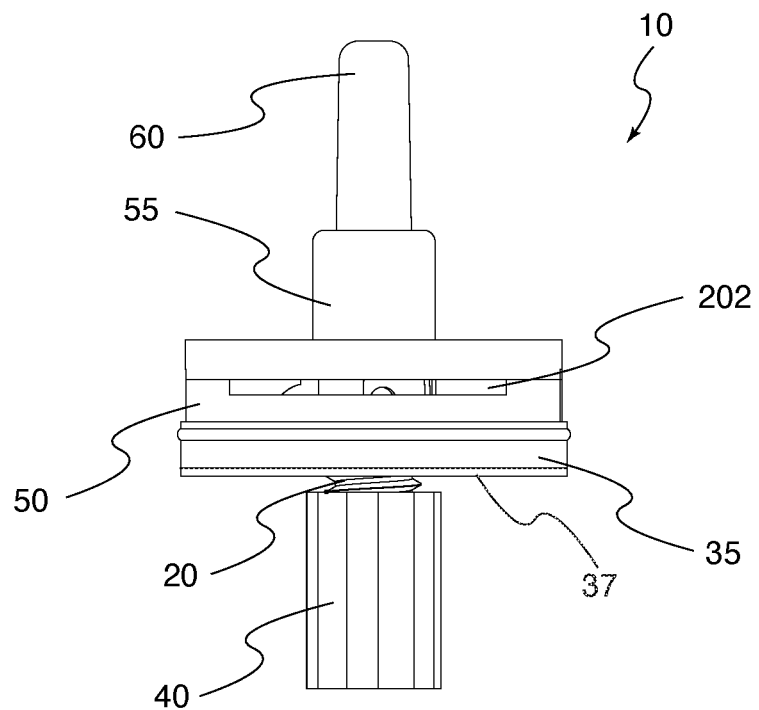
FIG. 4A illustrates an assembled view of a hood ornament mounting system, in accordance with an embodiment of the present invention.
Figure 4B:
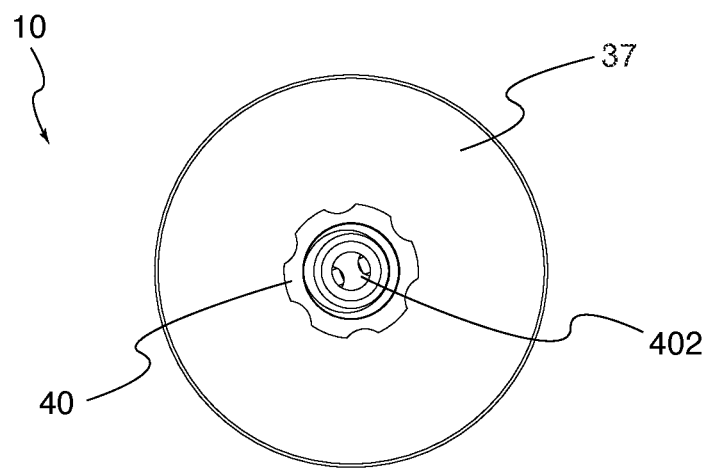
FIG. 4B illustrates a bottom view of the hood ornament mounting system shown in FIG. 4A, in accordance with an embodiment of the present invention.
Figure 4C:
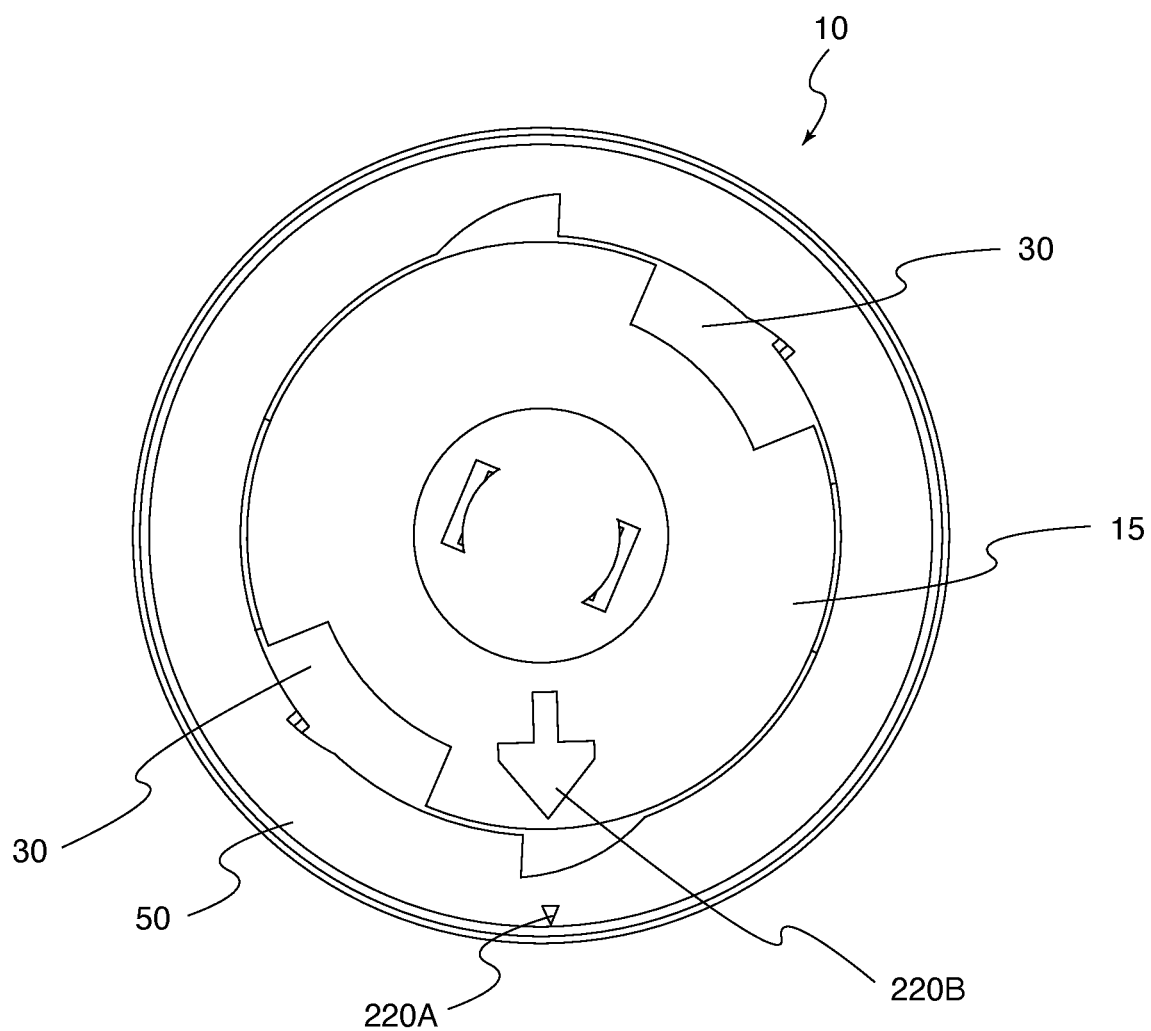
FIG. 4C illustrates a top view of the hood ornament mounting system shown in FIG. 4A, in accordance with an embodiment of the present invention.
Figure 5A:
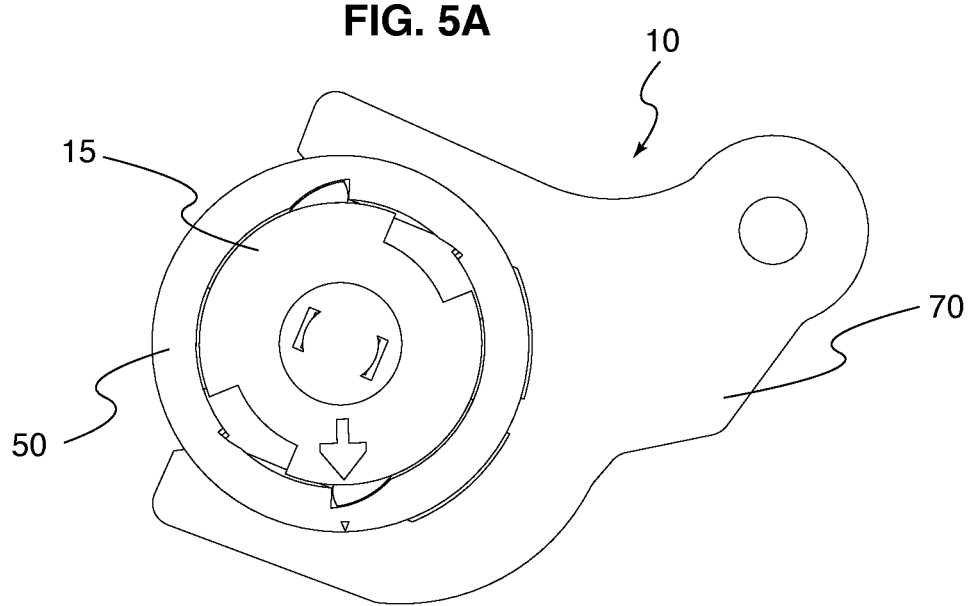
FIG. 5A illustrates a top view of the hood ornament mounting system shown in FIG. 4A with a key engaged, in accordance with an embodiment of the present invention.
Figure 5B:
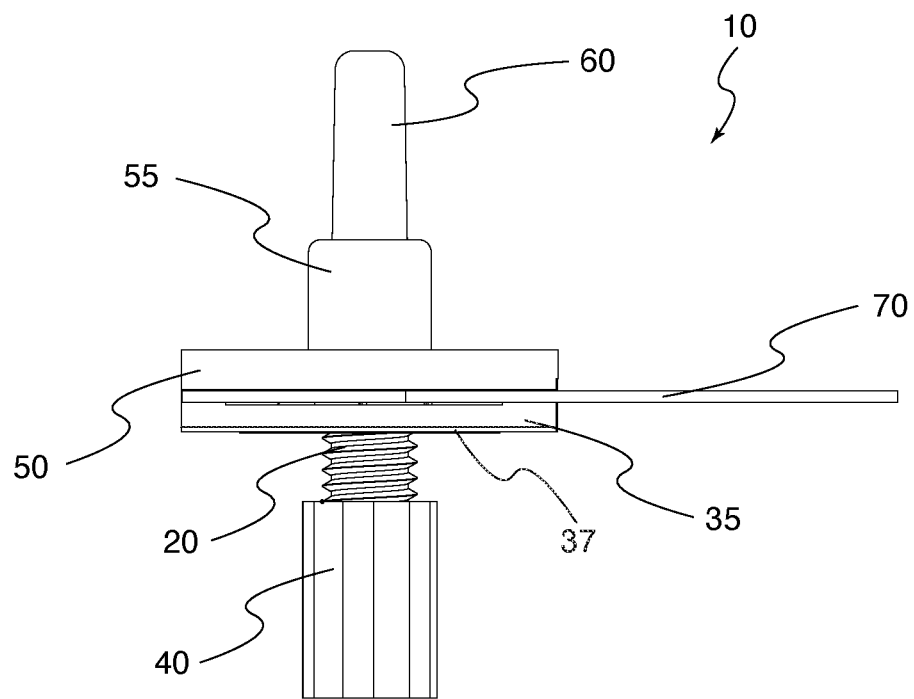
FIG. 5B illustrates a side view of the hood ornament mounting system shown in FIG. 5A, in accordance with an embodiment of the present invention.
Figure 5C:
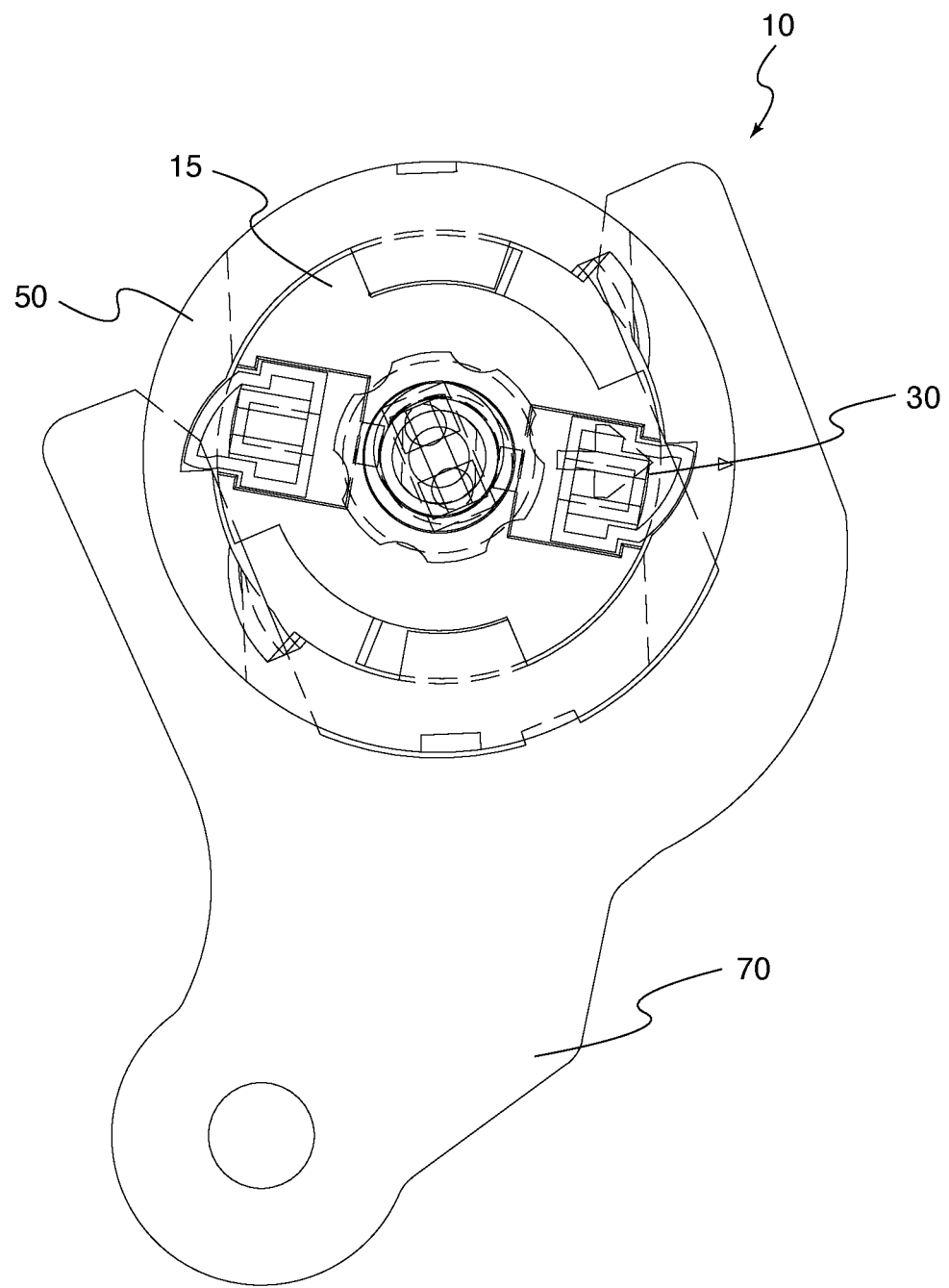
FIG. 5C illustrates a cross sectional top view of the hood ornament mounting system shown in FIG. 5A taken along a top surface of the key, in accordance with an embodiment of the present invention.
Figure 6:
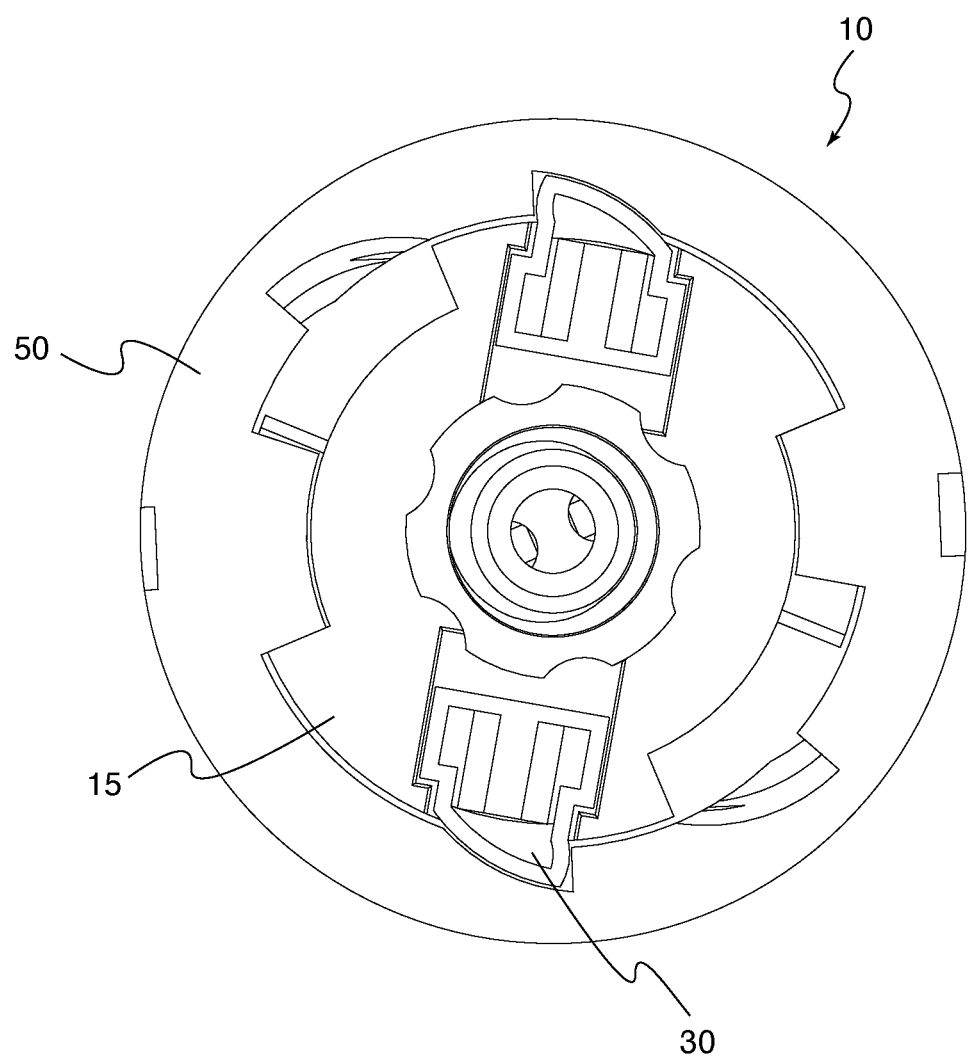
FIG. 6 illustrates a top view of the hood ornament mounting system shown in FIG. 4A showing locking pins engaged, in accordance with an embodiment of the present invention.

Turning to FIG. 2, the ring member 50 has a pair of through channels 202 formed on opposite sides of the perimeter of the ring member 50. The through channels 202 are dimensioned to accept the key 70. The key 70 when inserted into the through channels 202 in the manner shown in FIGS. 5A, 5B and 5C, compresses the locking pins 30 into the recesses of the base member 15, thus allowing the ring member 50 to rotate back to an unlocked position. The unlocked position can be identified, in some embodiments, by a first indicia 220A provided on the ring member 50 and a corresponding second indicia 220B provided on the base member 15. The ring member 50 is in the unlocked position when the first indicia 220A and the second indicia 220B are aligned. FIG. 4C shows a top view of an assembled hood ornament mounting system 10 with the first indicia 220A and the second indicia 220B aligned in an unlocked position.

Figure 3:
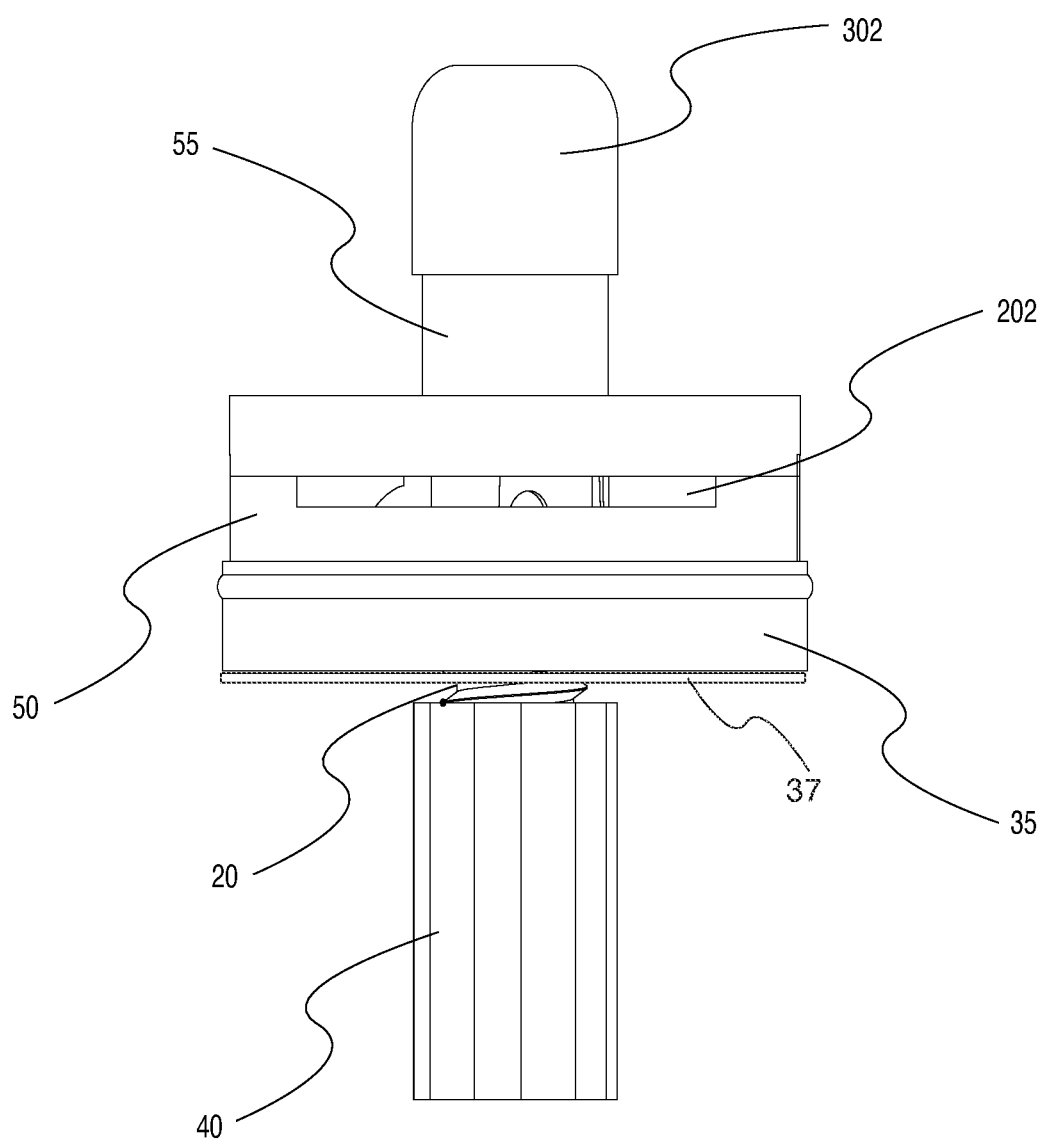
FIG. 3 illustrates an assembled view of a hood ornament mounting system, in accordance with an embodiment of the present invention.

FIG. 3 shows an embodiment of an assembled hood ornament mounting system 10. In the embodiment shown, a cap 302 can be placed over the electrical socket 55 instead of a light source 60. The cap 302 can act as a protective cover preventing moisture and particulates from entering the electrical socket 55. FIG. 4A shows an embodiment of an assembled hood ornament mounting system 10 with the light source 60 installed. FIG. 4B shows a bottom view of the assembled hood ornament mounting system 10 showing the hole 402 through which electrical wires (not shown) can be passed from the electrical socket 55 to a power source.

Figure 7:
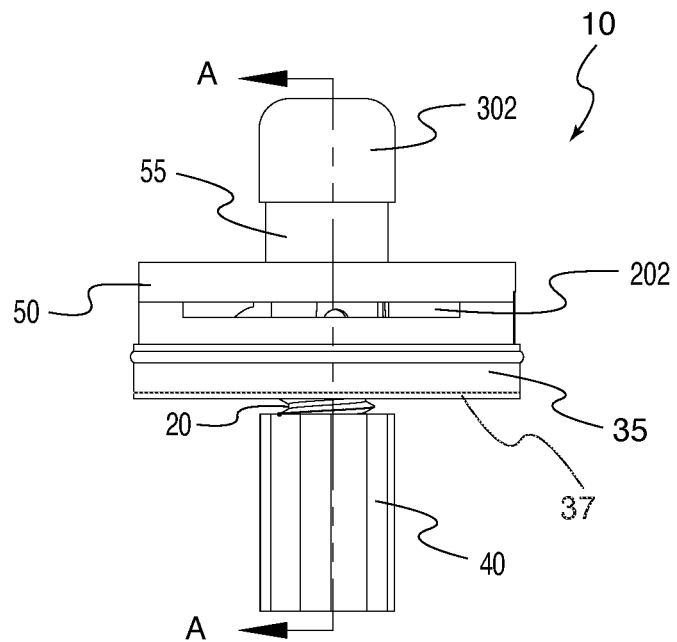
FIG. 7 illustrates an assembled view of a hood ornament mounting system, in accordance with an embodiment of the present invention.
Figure 8:
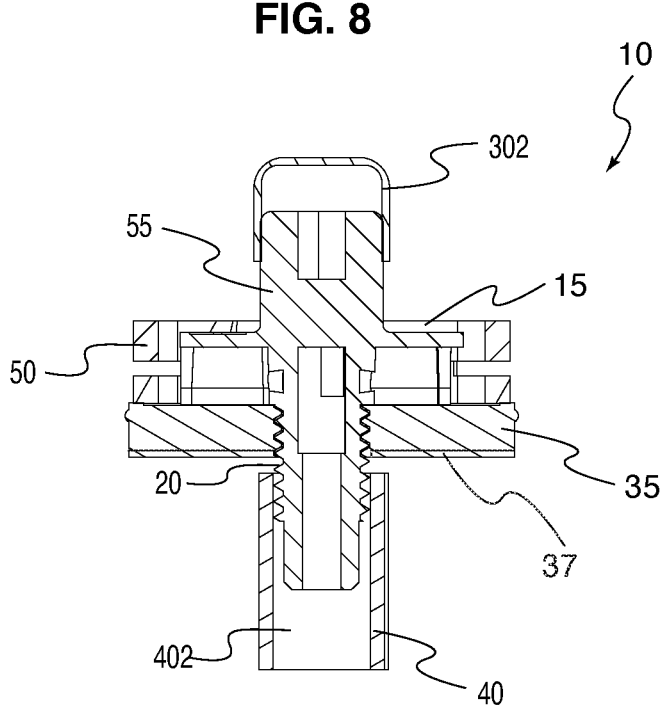
FIG. 8 illustrates a cross section of the hood ornament mounting system shown in FIG. 7 along cut line A-A, in accordance with an embodiment of the present invention.

FIG. 7 shows the hood ornament mounting system 10 of FIG. 3 with cut line A-A along which a cross section shown in FIG. 8 is taken.

Figure 9:
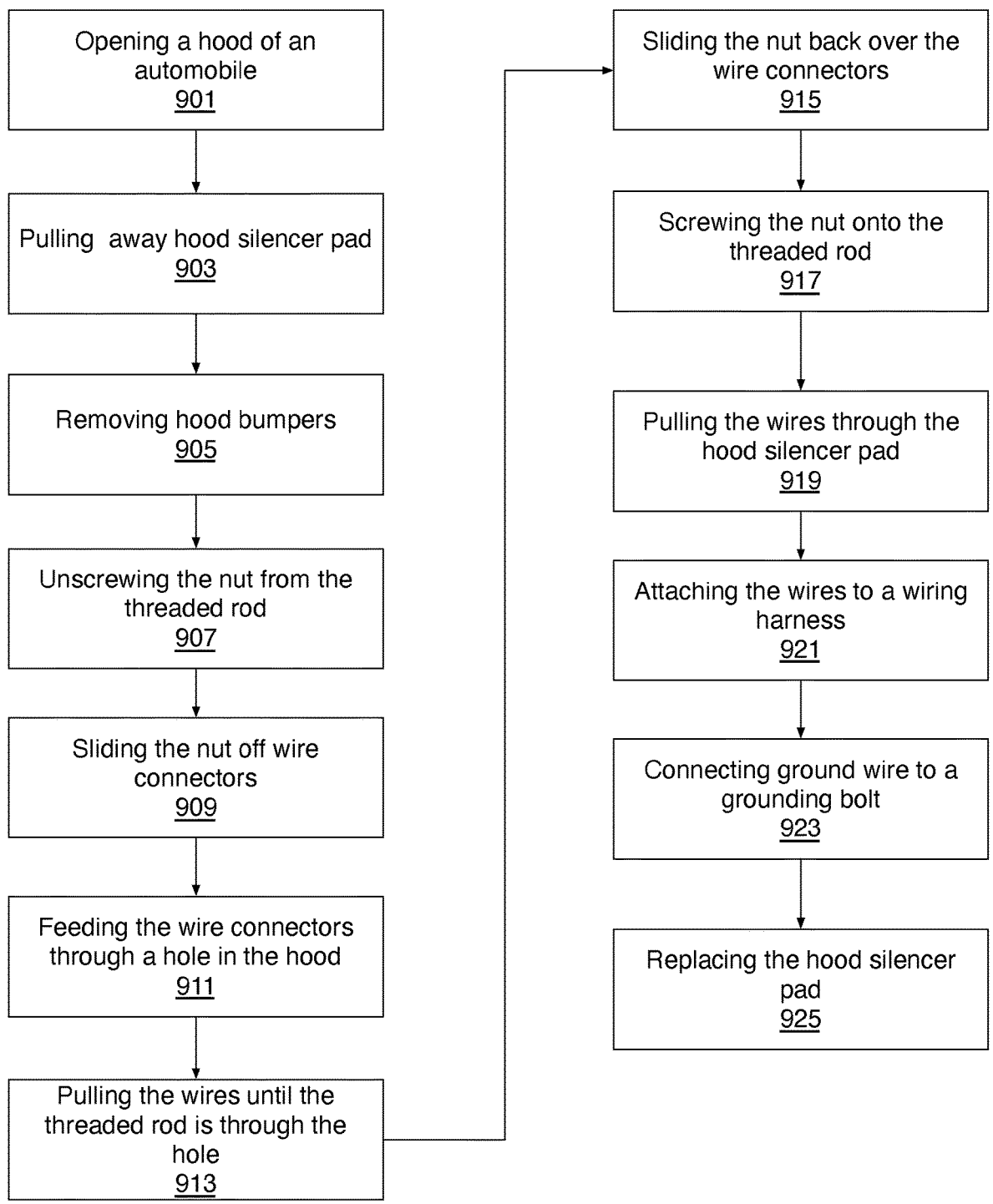
FIG. 9 illustrates a process for installing a hood ornament mounting system, in accordance with an embodiment of the present invention.

FIG. 9 illustrates a process for installing an embodiment of the hood ornament mounting system 10 on an automobile hood. Initially, the installation process begins by an installer opening a hood of the automobile at block 901. The hood silencer pad is pulled away from behind tabs located on each side of the hood at block 903. Using needle nose pliers, at block 905, hood bumpers are removed. The nut 40 is unscrewed, at block 907, from the threaded rod 20. The nut 40 is removed at block 909 by sliding the nut 40 over wire connectors. The wire connectors are fed one at a time through a hole in the hood at block 911. The wires are gently pulled at block 913 until the threaded rod 20 is through the hole. At block 915 the nut 40 is slid over the wire connectors, and the nut 40 is screwed onto the threaded rod 20 until tight at block 917. The wires are pulled through the hood silencer pad at block 919, and attached to wiring harness push pins at block 921. The ground wire is connected to a ground bolt at block 923 using a 10 mm wrench. At block 923, a grounding wire nut located on a side of the engine compartment adjacent to a fuse box is slightly loosened and the ground connectors are slid between the grounding wire nut and the bolt connected to the side of engine compartment. The grounding wire nut is securely tightened. At block 925, the hood silencer pad is replaced behind the tabs on the underside of the hood.

While embodiments of the present invention are described hereinabove as being mounted to an automobile hood, embodiments of the hood ornament mounting system 10 can be mounted on any vehicle, such as motorcycles, boats, RVs, tractor trailers, ATVs, delivery trucks, mail carrier vehicle, emergency vehicles (police, fire, ambulance), construction equipment, bus (school and public transit), tractors, personal watercraft, trains, snowmobile, taxi, for example. Moreover, some embodiments can be applied to other areas of a vehicle other than a hood. In still other embodiments, the ornament mounting system, including anti-theft features, may have applications other than for vehicles, such as home décor, residential and commercial lighting applications.

In other embodiments, the hood ornament mounting system 10 can include a Bluetooth® transceiver configured to provide wireless control of the light source 60 via a mobile device. The Bluetooth® transceiver can be configured to turn the light source 60 on/off, change the light intensity, or change the light color (e.g., wavelength) of the light source 60. In other embodiments the hood ornament mounting system 10 can include a light sensor configured to activate the light source 60 when ambient light falls below a threshold. In other embodiments the hood ornament mounting system 10 can include a motion sensor configured to activate the light source 60 when the vehicle is in motion.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A hood ornament mounting system, comprising:
   a ring member having a keyed structure, including dentations, along an internal perimeter of the ring member, and a pair of through channels formed along an outside perimeter of the ring member at opposite regions;
   a base member having a generally circular cross section with a pair of recesses formed at opposite regions along a perimeter of the base member, a bottom surface of the base member configured to contact a surface of an automobile and a top surface of the base member dimensioned to fit within the internal perimeter of the ring member, the base member having grooves formed on the perimeter of the base member, the grooves configured to accommodate the dentations;
   a locking pin seated in each of the pair of recesses, the locking pin including a spring exerting an outward force on the locking pin relative to the base member and configured to lockingly interact with the keyed structure, the locking pin providing an anti-theft mechanism; and
   a threaded rod extending from the bottom surface of the base member, the threaded rod being configured to be inserted into a through hole formed on the surface of the automobile.

2. The hood ornament mounting system of claim 1, wherein the threaded rod is configured to be inserted into a through hole formed on the surface of the automobile such that a washer can be held on the surface of the automobile and a nut can be seated on the threaded rod on an opposite side of the automobile surface.

3. The hood ornament mounting system of claim 1, wherein a quarter turn of the ring member with respect to the base member causes the locking pins to rotate from an insertion position to a locking position within the ring member.

4. The hood ornament mounting system of claim 3, wherein once the locking pins are in the locking position, the ring member cannot be rotated against the base member to a disengaging position without use of a key.

5. The hood ornament mounting system of claim 1, wherein the ring member is formed as part of a hood ornament.

6. The hood ornament mounting system of claim 1, wherein the base member includes an electrical socket configured to receive a light source.

7. The hood ornament mounting system of claim 6, wherein the light source is powered by a replaceable battery integrated with the hood ornament mounting system or housed in a separate casing and connected by wires to the light source.

8. The hood ornament mounting system of claim 6, wherein the light source is configured for coupling by wires directly to a fuse box of the automobile.

9. A hood ornament mounting system, comprising:
   a ring member having a keyed structure, including dentations, along an internal perimeter of the ring member, and a pair of through channels formed along an outside perimeter of the ring member at opposite regions;
   a base member having a generally circular cross section with a pair of recesses formed at opposite regions along a perimeter of the base member, a bottom surface of the base member configured to contact a surface of an automobile and a top surface of the base member dimensioned to fit within the internal perimeter of the ring member, the base member having grooves formed on the perimeter of the base member, the grooves configured to accommodate the dentations;
   a locking pin seated in each of the pair of recesses, the locking pin including a spring exerting an outward force on the locking pin relative to the base member and configured to lockingly interact with the keyed structure, the locking pin providing an anti-theft mechanism;

a threaded rod extending from the bottom surface of the base member, the threaded rod being configured to be inserted into a through hole formed on the surface of the automobile; and a key having protrusions configured to enter the through channels of the ring member, each protrusion engaging with a respective locking pin to exert an inward force on the locking pin to unlock the locking pin from the keyed structure.

10. The hood ornament mounting system of claim 9, wherein the threaded rod is configured to be inserted into a through hole formed on the surface of the automobile such that a washer can be held on the surface of the automobile and a nut can be seated on the threaded rod on an opposite side of the automobile surface.

11. The hood ornament mounting system of claim 9, wherein a quarter turn of the ring member with respect to the base member causes the locking pins to rotate from an insertion position to a locking position within the ring member.

12. The hood ornament mounting system of claim 11, wherein once the locking pins are in the locking position, the ring member cannot be rotated against the base member to a disengaging position without use of a key.

13. The hood ornament mounting system of claim 9, wherein the ring member is formed as part of a hood ornament.

14. The hood ornament mounting system of claim 9, wherein the base member includes an electrical socket configured to receive a light source.

15. The hood ornament mounting system of claim 14, wherein the light source is powered by a replaceable battery integrated with the hood ornament mounting system or housed in a separate casing and connected by wires to the light source.

16. The hood ornament mounting system of claim 14, wherein the light source is configured for coupling by wires directly to a fuse box of the automobile.

17. The hood ornament mounting system of claim 9, wherein when the key enters the through channels of the ring member, the key compresses the locking pins into the recesses of the base member, thus allowing the ring member to rotate back to an unlocked position.

18. The hood ornament mounting system of claim 17, wherein the unlocked position of the ring member is identified by a first indicia provided on the ring member and a second indicia provided on the base member, the ring member being in the unlocked position when the first indicia and the second indicia are aligned.

19. A hood ornament mounting system, comprising:
a ring member having a keyed structure, including dentations, along an internal perimeter of the ring member, and a pair of through channels formed along an outside perimeter of the ring member at opposite regions;
a base member having a pair of recesses formed at opposite regions along a perimeter of the base member, a bottom surface of the base member configured to contact a surface of an automobile and a top surface of the base member dimensioned to fit within the internal perimeter of the ring member, the base member having grooves formed on the perimeter of the base member, the grooves configured to accommodate the dentations; and
a locking pin seated in each of the pair of recesses, the locking pin including a spring exerting an outward force on the locking pin relative to the base member and configured to lockingly interact with the keyed structure.

20. The hood ornament mounting system of claim 19, further comprising a key having protrusions configured to enter the through channels of the ring member, each protrusion engaging with a respective locking pin to exert an inward force on the locking pin to unlock the locking pin from the keyed structure.

* * * * *